(12) United States Patent
Wang et al.

(10) Patent No.: US 11,289,983 B2
(45) Date of Patent: Mar. 29, 2022

(54) INTEGRATED ELECTRICAL MOTOR

(71) Applicant: Jing-Jin Electric Technologies Co., Ltd., Beijing (CN)

(72) Inventors: Haibin Wang, Beijing (CN); Zhengqiang Pei, Beijing (CN); Ping Yu, Beijing (CN)

(73) Assignee: Jing-Jin Electric Technologies Co., Ltd., Beijing (CN)

( * ) Notice: Subject to any disclaimer, the term of this patent is extended or adjusted under 35 U.S.C. 154(b) by 681 days.

(21) Appl. No.: 16/074,782

(22) PCT Filed: Jan. 19, 2017

(86) PCT No.: PCT/CN2017/071730
§ 371 (c)(1),
(2) Date: Aug. 2, 2018

(87) PCT Pub. No.: WO2017/133476
PCT Pub. Date: Aug. 10, 2017

(65) Prior Publication Data
US 2019/0036424 A1    Jan. 31, 2019

(30) Foreign Application Priority Data
Feb. 4, 2016   (CN) .......................... 201610080626.7

(51) Int. Cl.
*H02K 11/30* (2016.01)
*H02K 16/00* (2006.01)
(Continued)

(52) U.S. Cl.
CPC ............... *H02K 11/30* (2016.01); *H02K 1/28* (2013.01); *H02K 5/04* (2013.01); *H02K 7/003* (2013.01);
(Continued)

(58) Field of Classification Search
CPC . H02K 11/30; H02K 1/28; H02K 5/04; H02K 16/00; H02K 2213/06; H02K 2213/12; H02K 7/003
See application file for complete search history.

(56) References Cited

U.S. PATENT DOCUMENTS 4,384,226 A * 5/1983 Sato .................... H02K 5/15
310/216.115
5,357,180 A   10/1994 Speicher
(Continued)

FOREIGN PATENT DOCUMENTS

CN   2588649 Y   11/2003
CN   2854910 Y    1/2007
(Continued)

OTHER PUBLICATIONS

International Bureau of WIPO, International Search Report and Written Opinion in Application No. PCT/CN2017/071730 dated Apr. 24, 2017.
(Continued)

*Primary Examiner* — Tulsidas C Patel
*Assistant Examiner* — Riley Owen Stout
(74) *Attorney, Agent, or Firm* — LKGlobal | Lorenz & Kopf, LLP

(57) ABSTRACT

The present disclosure discloses an integrated electrical motor, comprising at least two sets of corresponding stators and rotors, wherein the at least two sets of corresponding stators and rotors are mounted within the same housing, and are connected to the corresponding controllers, and the rotors are mounted on the same shaft. The total output torque of the electrical motor can be distributed to the shaft from different stator/rotor pairs, and when one or more of the sets of stators and rotors have malfunction, the remaining stators and rotors maintain running. The integrated electrical motor of the present disclosure has compact structure, small axial (Continued)

dimension, distributable torque, high safety margin and high reliability.

9 Claims, 2 Drawing Sheets

(51) Int. Cl.
  *H02K 1/28* (2006.01)
  *H02K 7/00* (2006.01)
  *H02K 5/04* (2006.01)
(52) U.S. Cl.
  CPC ......... *H02K 16/00* (2013.01); *H02K 2213/06* (2013.01); *H02K 2213/12* (2013.01)

(56) References Cited

U.S. PATENT DOCUMENTS

| | | | |
|---|---|---|---|
| 6,455,976 | B1 | 9/2002 | Nakano |
| 7,122,923 | B2 * | 10/2006 | Lafontaine ............. H02K 1/187 310/58 |
| 2001/0020805 | A1 | 9/2001 | Nakano et al. |
| 2002/0113511 | A1 | 8/2002 | Daikoku et al. |
| 2005/0258795 | A1 | 11/2005 | Choi |
| 2007/0296281 | A1 | 12/2007 | Choi |
| 2011/0234145 | A1 | 9/2011 | Langreck |
| 2015/0244300 | A1 * | 8/2015 | Chuang ................. H02K 16/00 318/766 |
| 2016/0087517 | A1 * | 3/2016 | Powell ................... H02K 16/00 310/103 |
| 2018/0145570 | A1 * | 5/2018 | Wang ................... H02K 41/025 |

FOREIGN PATENT DOCUMENTS

| | | |
|---|---|---|
| CN | 201563041 U | 8/2010 |
| CN | 201690329 U | 12/2010 |
| CN | 101951088 A | 1/2011 |
| CN | 102097904 A | 6/2011 |
| CN | 102299596 A | 12/2011 |
| CN | 101707428 B | 1/2013 |
| CN | 102868266 A | 1/2013 |
| CN | 103312101 A | 9/2013 |
| CN | 103490555 A | 1/2014 |
| CN | 104506000 A | 4/2015 |
| CN | 104810998 A | 7/2015 |
| CN | 104967268 A | 10/2015 |
| CN | 105048743 A | 11/2015 |
| CN | 105703582 A | 6/2016 |
| CN | 205583962 U | 9/2016 |
| DE | 102009054347 A1 | 6/2011 |
| JP | 2001218432 A | 8/2001 |
| JP | 2015159716 A | 9/2015 |
| WO | 2015040510 A1 | 3/2015 |

OTHER PUBLICATIONS

Chinese Patent Office, Examination Report in Application No. 201610080626.7 dated Aug. 11, 2017.
Chinese Patent Office, Examination Report in Application No. 201610080626.7 dated Apr. 13, 2018.
European Patent and Trademark Office, European Search Report for Application No. 17746796.6, dated Sep. 17, 2018.
National Intellectual Property Administration, Office Action in Application No. 2018101001906670 dated Oct. 15, 2018.
National Intellectual Property Administration, Supplemental Search in Application No. 2018101001906670 dated Oct. 15, 2018.

* cited by examiner

INTEGRATED ELECTRICAL MOTOR

CROSS-REFERENCE TO RELATED APPLICATION

This Application is a U.S. National Stage entry under 35 U.S.C. § 371 based on International Application No. PCT/CN2017/071730, filed on Jan. 19, 2017, which was published under PCT Article 21(2) and which claims priority to Chinese Patent Application No. 201610080626.7, filed on Feb. 4, 2016 which are all hereby incorporated herein by reference in their entirety.

TECHNICAL FIELD

This Application pertains to the technical field of electrical motors, and particularly relates to an integrated electrical motor.

BACKGROUND

Electrical motors are the core driving unit of new energy vehicles, and if the driving electrical motor has malfunction, the entire vehicle loses the fundamental function. In the prior art, some vehicles are mounted therein with two driving electrical motors that are simply connected in series, and when one of the electrical motors has malfunction, the other electrical motor can maintain the operation. However, the technical solution of the two electrical motors that are connected in series greatly increases the axial dimension and the weight of the electrical motors. In addition, other objects, desirable features and characteristics will become apparent from the subsequent summary and detailed description, and the appended claims, taken in conjunction with the accompanying drawings and this background.

SUMMARY

In view of the above problems, this Application provides an integrated electrical motor, to solve the problem in the prior art that the series connection of two electrical motors greatly increases the axial dimension and the weight of the electrical motors.

To achieve the above objects, the technical solutions of this Application are realized as follows:

This Application provides an integrated electrical motor, wherein the integrated electrical motor comprises: a shaft, a first stator, a first rotor, a second stator, a second rotor, a first controller, a second controller, a power supply and a housing, the housing comprises: a middle shell and two end caps, wherein the two end caps are mounted at two ends of the middle shell; and two ends of the shaft are fixed on the two end caps respectively;

the first rotor and the second rotor are fixedly mounted on the shaft, and the first stator and the second stator are fixed on inner sidewall of the middle shell and respectively correspond to locations of the first rotor and the second rotor;

the power supply is connected to the first controller and the second controller, the first controller and the first stator are electrically connected, and the second controller and the second stator are electrically connected; and the first controller and the second controller control torques of the first rotor and the second rotor by controlling electric currents in the first stator and the second stator.

Optionally, the integrated electrical motor further comprises: two bearings, wherein the two bearings are mounted on the two end caps, and the two ends of the shaft are fixed on the two bearings.

Optionally, the shaft is further provided thereon with a shaft shoulder, and the first rotor and the second rotor are mounted on the shaft via the two ends of the shaft, and are clipped on two sides of the shaft shoulder.

Optionally, the shaft consists of two sections: a left section and a right section, wherein a diameter of the left section is less than a diameter of the right section, and the left section and the right section form a clipping platform therebetween; and when the first rotor and the second rotor are mounted on the shaft, the second rotor is first mounted to the right section of the shaft via a left end of the shaft, and then the first rotor is mounted to the left section of the shaft via the left end of the shaft and is clipped on the clipping platform.

Optionally, the middle shell is integrally moulded.

Optionally, the middle shell is formed by a left shell and a right shell, the first stator is fixed on inner sidewall of the left shell, and the second stator is fixed on inner sidewall of the right shell.

Optionally, the integrated electrical motor further comprises: an outputting flange, wherein the outputting flange is mounted at one end of the shaft, and the outputting flange is connected to an output shaft of the integrated electrical motor.

Optionally, the integrated electrical motor further comprises: N number of stators, N number of rotors and N number of controllers, the N number of rotors are fixedly mounted on the shaft, the N number of stators are fixed on the shell and respectively correspond to locations of the N number of rotors, and the N number of controllers are electrically connected to the N number of stators respectively, wherein, N is a natural number greater than or equal to 1.

The advantageous effects of the embodiments of this Application are: in the integrated electrical motor that is provided by this Application, the first rotor and the second rotor are mounted on the same shaft, and the first stator and the second stator are fixed on the inner sidewalls of the corresponding locations of the housing. The integrated electrical motor has a compact structure, the axial dimension and the weight are greatly reduced, and the outputted torque can be distributed by the first controller and the second controller, which improves the safety margin and the reliability of the electrical motor.

The above description is only an overview of the technical solutions of this Application. In order to understand the technical means of this Application more clearly, and to implement them according to the contents of the description, and in order to make the above and other objects, features and advantages of this Application more fully understood, the special embodiments of this Application are provided below.

BRIEF DESCRIPTION OF THE DRAWINGS

The present invention will hereinafter be described in conjunction with the following drawing figures, wherein like numerals denote like elements, and.

By reading the detailed description of the preferable embodiments below, various other advantages and benefits will become clear to a person skilled in the art. The drawings are only for the purpose of illustrating the preferable embodiments, and are not considered as limitation to this Application. Furthermore, throughout the drawings, the same reference signs denote the same elements. In the drawings.

Figure 1:
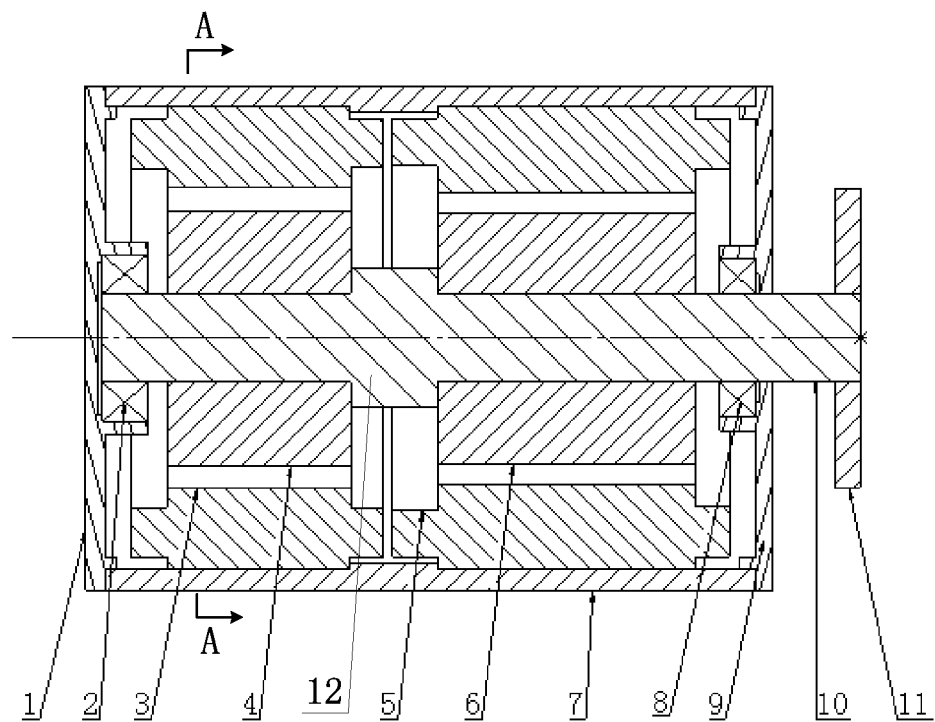
FIG. 1 is the sectional view of the integrated electrical motor of the first embodiment of this Application.

In that, 1 and 9 are the end caps, 2 and 8 are the bearings, 3 is the first stator, 4 is the first rotor, 5 is the second stator, 6 is the second rotor, 7 is the middle shell, 10 and 10' are the shafts, 11 is the outputting flange, 12 is the shaft shoulder, 13 is the left section, 14 is the clipping platform, and 15 is the right section.

DETAILED DESCRIPTION

The following detailed description is merely exemplary in nature and is not intended to limit the invention or the Application and uses of the invention. Furthermore, there is no intention to be bound by any theory presented in the preceding background of the invention or the following detailed description.

The exemplary embodiments of this Application will be described in further detail below by referring to the drawings. Although the drawings illustrate the exemplary embodiments of this Application, it should be understood that, this Application can be implemented in various forms, and should not be limited by the embodiments illustrated herein. In contrast, the purpose of providing those embodiments is to more clearly understand this Application, and to completely convey the scope of this Application to a person skilled in the art.

The First Embodiment

Figure 2:
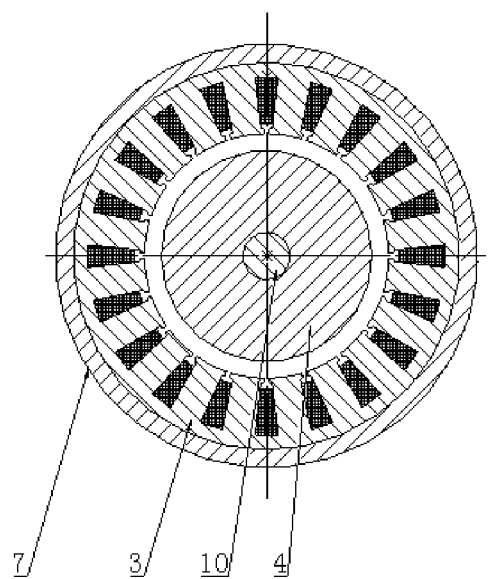
FIG. 2 is the sectional view of the A-A plane of FIG. 1.

FIG. 1 is the sectional view of the integrated electrical motor of the first embodiment of this Application, and FIG. 2 is the sectional view of the A-A plane of FIG. 1. As shown jointly by FIG. 1 and FIG. 2, the first embodiment of this Application provides an integrated electrical motor, wherein the integrated electrical motor comprises: a shaft 10, a first stator 3, a first rotor 4, a second stator 5, a second rotor 6, a first controller, a second controller, a power supply and a housing. The housing comprises: a middle shell 7 and two end caps 1, 9, wherein the two end caps 1, 9 are mounted at the two ends of the middle shell 7, and the middle shell 7 and the two end caps form a closed space. As shown by FIG. 2, in the first embodiment of this Application, the cross-section of the middle shell 7 is a circle, and certainly may also be set to be other shapes, such as square.

The two ends of the shaft 10 are fixed on the end caps respectively. The first rotor 4 and the second rotor 6 are fixedly mounted on the shaft 10. The first stator 3 and the second stator 5 are fixed on the inner sidewall of the middle shell 7 and respectively correspond to the locations of the first rotor 4 and the second rotor 6. The power supply is connected to the first controller and the second controller, the first controller and the first stator 3 are electrically connected, and the second controller and the second stator 5 are electrically connected. The first controller and the second controller control the torques of the first rotor 4 and the second rotor 6 by controlling the electric currents in the first stator 3 and the second stator 5.

Figure 4:
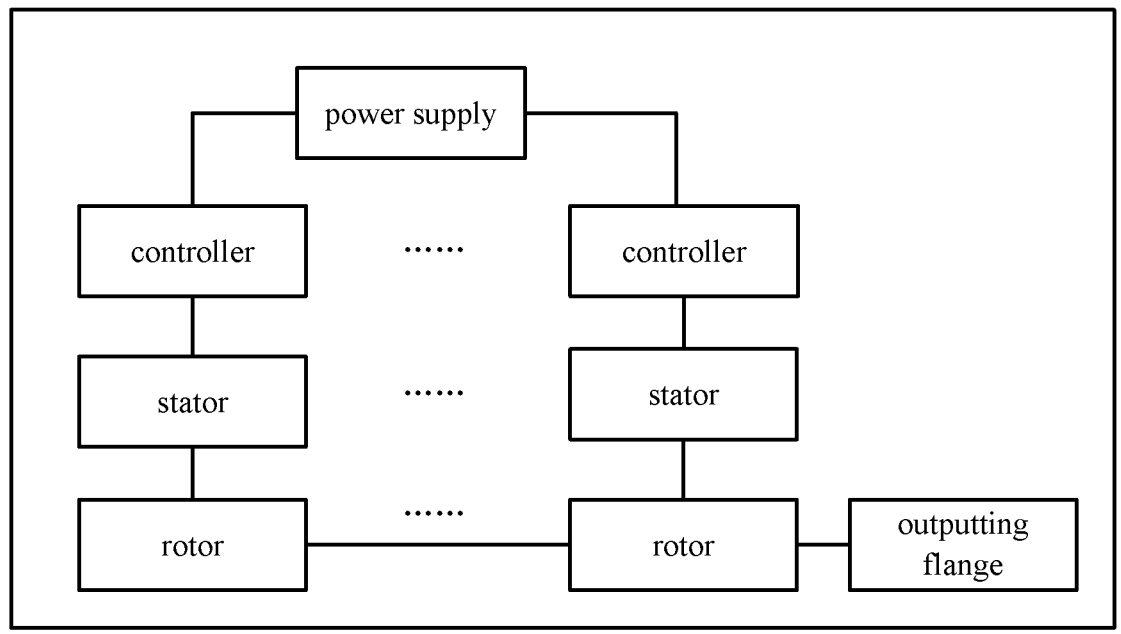
FIG. 4 is the logical block diagram of the integrated electrical motor of the first embodiment of the present disclosure.

FIG. 4 is the logical block diagram of the integrated electrical motor of the first embodiment of this Application. As shown by FIG. 4, when the power supply starts up, the first controller and the second controller run, and because the first controller and the first stator 3 are electrically connected and the second controller and the second stator 5 are electrically connected, the first controller and the second controller control the torques of the first rotor 4 and the second rotor 6 by controlling the electric currents in the first stator 3 and the second stator 5. Because both of the first rotor 4 and the second rotor 6 are fixedly connected to the shaft 10, thereby together driving the shaft 10 to turn and output a torque, the sum of the torques that are generated by the first rotor 4 and the second rotor 6 is the total outputted torque of the shaft 10. When the integrated electrical motor is normally working, the first controller and the second controller respectively control the first rotor 4 and the second rotor 6 to generate different torques, thereby causing the first rotor 4 and the second rotor 6 to bear different torques, to facilitate utilizing the performances of the first rotor 4 and the second rotor 6.

Accordingly, it can be known that, when the first rotor 4 or the first stator 3 in the integrated electrical motor has malfunction, the second controller can control the second rotor 6 and the second stator 5 to maintain the operation. In like manner, when the second rotor 6 or the second stator 5 has malfunction, the first rotor 4 and the first stator 3 can maintain the operation. Therefore, this Application improves the reliability and the safety margin of the integrated electrical motor. Furthermore, because the first rotor and the second rotor are mounted on the same shaft, and are mounted within the same housing together with the first stator and the second stator, the integrated electrical motor has a compact structure, and the axial dimension and the weight are greatly reduced. When the integrated electrical motor is applied to new energy vehicles, because the electrical motor is the core driving unit, this Application can improve the reliability of the entire vehicle and greatly reduce the weight of the entire vehicle.

In the first embodiment of this Application, the integrated electrical motor further comprises: two bearings 2, 8. The two bearings 2, 8 are mounted on two end caps 1, 9 respectively, the two ends of the shaft 10 are fixed on the two bearings 2, 8 respectively, and the bearings 2, 8 support the turning of the shaft 10, the first rotor 4 and the second rotor 6.

In the first embodiment of this Application, the shaft 10 is further provided with a shaft shoulder 12, and the first rotor 4 and the second rotor 6 are mounted on the shaft 10 via the two ends of the shaft 10, and are clipped on the two sides of the shaft shoulder 12 respectively. The providing of the shaft shoulder 12 on the shaft 10 does not only facilitate isolating the first rotor 4 from the second rotor 6, but also enables to mount the first rotor 4 and the second rotor 6 from the two ends of the shaft 10, with more convenient operation.

In the first embodiment of this Application, the middle shell 7 is integrally moulded. The middle shell 7 may also be formed by a left shell and a right shell, which facilitates the operation when the first stator 3 and the second stator 5 are being mounted; that is, the first stator 3 is fixed on the inner sidewall of the left shell, and the second stator 5 is fixed on the inner sidewall of the right shell.

In the first embodiment of this Application, the integrated electrical motor further comprises: an outputting flange 11. The outputting flange 11 is mounted at one end of the shaft 10, and the outputting flange 11 is connected to the output shaft of the integrated electrical motor.

In the first embodiment of this Application, the integrated electrical motor further comprises: N number of stators, N number of rotors and N number of controllers, wherein the N number of rotors are fixedly mounted on the shaft 10, the N number of stators are fixed on the middle shell 7 and respectively correspond to the locations of the N number of rotors, and the N number of controllers are electrically connected to the N number of stators respectively, wherein, N is a natural number greater than or equal to 1. When one or more of the sets of corresponding stators and rotors have malfunction, the remaining stators and rotors maintain running, thereby further improving the safety margin and the reliability of the integrated electrical motor.

The Second Embodiment

Figure 3:
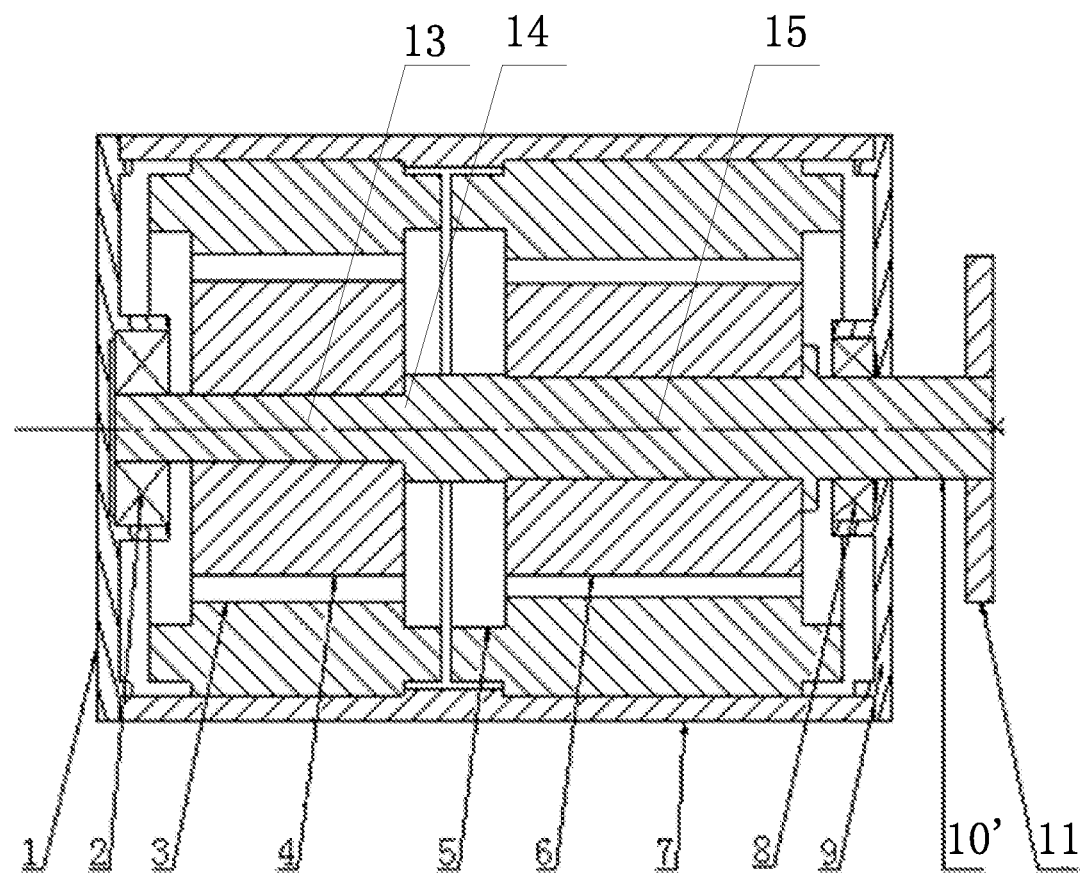
FIG. 3 is the sectional view of the integrated electrical motor of the second embodiment of the present disclosure.

FIG. 3 is the sectional view of the integrated electrical motor of the second embodiment of this Application. The second embodiment differs from the first embodiment in that, the shaft 10' consists of two sections: a left section 13 and a right section 15, wherein the diameter of the left section 13 is less than the diameter of the right section 15, and the left section 13 and the right section 15 form a clipping platform 14 therebetween; and when the first rotor and the second rotor are mounted on the shaft, the second rotor 6 is first mounted to the right section 15 of the shaft 10' via the left end of the shaft 10', and then the first rotor 4 is mounted to the left section 13 of the shaft 10' via the left end of the shaft 10' and is clipped on the clipping platform 14. The rest structures of the second embodiment are similar to those of the first embodiment, which is not discussed here further.

In conclusion, the advantageous effects of the embodiments of this Application are: in the integrated electrical motor that is provided by the embodiments of this Application, the first rotor and the second rotor are mounted on the same shaft, and the first stator and the second stator are fixed on the inner sidewalls of the corresponding locations of the housing. The integrated electrical motor has a compact structure, the axial dimension and the weight are greatly reduced, and the outputted torque can be distributed by the first controller and the second controller, which improves the safety margin and the reliability of the electrical motor.

The above description is merely preferable embodiments of this Application, and is not limiting the protection scope of this Application. Any modifications, equivalent substitutions or improvements that are made within the spirit and principle of this Application are all included in the protection scope of this Application.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. An integrated electrical motor, wherein the integrated electrical motor comprises: a shaft, a first stator, a first rotor, a second stator, a second rotor, a first controller, a second controller, a power supply and a housing,
   the housing comprises: a middle shell and two end caps, wherein the two end caps are mounted at two ends of the middle shell; and two ends of the shaft are fixed on the two end caps respectively;
   the first rotor and the second rotor are fixedly mounted on the shaft, and the first stator and the second stator are fixed on inner sidewall of the middle shell and respectively correspond to locations of the first rotor and the second rotor;
   the power supply is connected to the first controller and the second controller, the first controller and the first stator are electrically connected, and the second controller and the second stator are electrically connected;
   the first controller controls a torque of the first rotor by controlling a current in the first stator, and the second controller controls a torque of the second stator by controlling a current in the second rotor; and
   the outputted torques of the first rotor and the second rotor are distributed by the first controller and the second controller.

2. The integrated electrical motor according to claim 1, wherein, the integrated electrical motor further comprises: two bearings,
   wherein the two bearings are mounted on the two end caps respectively, and the two ends of the shaft are fixed on the two bearings respectively.

3. The integrated electrical motor according to claim 2, wherein, the shaft is further provided thereon with a shaft shoulder, and the first rotor and the second rotor are mounted on the shaft via the two ends of the shaft respectively, and are clipped on two sides of the shaft shoulder respectively.

4. The integrated electrical motor according to claim 2, wherein, the shaft consists of two sections: a left section and a right section, wherein a diameter of the left section is less than a diameter of the right section, and the left section and the right section form a clipping platform therebetween; and
   when the first rotor and the second rotor are mounted on the shaft, the second rotor is first mounted to the right section of the shaft via a left end of the shaft, and then the first rotor is mounted to the left section of the shaft via the left end of the shaft and is clipped on the clipping platform.

5. The integrated electrical motor according to claim 1, wherein, the middle shell is integrally moulded.

6. The integrated electrical motor according to claim 1, wherein, the middle shell is formed by a left shell and a right shell, the first stator is fixed on inner sidewall of the left shell, and the second stator is fixed on inner sidewall of the right shell.

7. The integrated electrical motor according to claim 3, wherein, the integrated electrical motor further comprises: an outputting flange, wherein the outputting flange is mounted at one end of the shaft, and the outputting flange is connected to an output shaft of the integrated electrical motor.

8. The integrated electrical motor according to claim 1, wherein, the integrated electrical motor further comprises: N number of stators, N number of rotors and N number of controllers,
   the N number of rotors are fixedly mounted on the shaft, the N number of stators are fixed on the shell and correspond to locations of the N number of rotors respectively, and the N number of controllers are electrically connected to the N number of stators respectively, wherein, N is a natural number greater than or equal to 1.

9. The integrated electrical motor according to claim 4, wherein, the integrated electrical motor further comprises: an outputting flange, wherein the outputting flange is mounted at one end of the shaft, and the outputting flange is connected to an output shaft of the integrated electrical motor.

* * * * *